(12) United States Patent
Heden et al.

(10) Patent No.: US 7,375,035 B2
(45) Date of Patent: May 20, 2008

(54) HOST AND ANCILLARY TOOL INTERFACE METHODOLOGY FOR DISTRIBUTED PROCESSING

(75) Inventors: Craig R. Heden, Pacifica, CA (US); Albert R. DePetrillo, Folsom, CA (US); Robert M. McGuire, Aptos, CA (US)

(73) Assignee: Ronal Systems Corporation, Morgan Hill, CA (US)

(*) Notice: Subject to any disclaimer, the term of this patent is extended or adjusted under 35 U.S.C. 154(b) by 764 days.

(21) Appl. No.: 10/426,593

(22) Filed: Apr. 29, 2003

(65) Prior Publication Data

US 2004/0220699 A1    Nov. 4, 2004

(51) Int. Cl.
*H01L 21/302*    (2006.01)
*H01L 21/461*    (2006.01)
*H01L 21/20*    (2006.01)
*H01L 21/36*    (2006.01)
*B01J 10/00*    (2006.01)

(52) U.S. Cl. .............................. 438/710; 700/1; 700/9; 700/11; 700/12; 700/17; 700/18; 700/19; 700/20; 700/23; 700/28; 700/90; 700/108; 700/117; 700/121; 700/123; 700/266; 700/268; 700/275; 422/129; 438/478; 438/479; 438/480; 438/689; 438/706

(58) Field of Classification Search .................... 700/1, 700/9, 11, 12, 17, 18, 19, 20, 23, 28, 90, 108, 700/117, 121, 123, 266, 268, 275; 422/129; 438/478, 479, 480, 689, 706, 710

See application file for complete search history.

(56) References Cited

U.S. PATENT DOCUMENTS

| | | | |
|---|---|---|---|
| 3,622,493 | A | 11/1971 | Crusco |
| 3,625,846 | A | 12/1971 | Murdoch et al. |
| 3,652,434 | A | 3/1972 | Bar-Nun et al. |
| 3,657,107 | A | 4/1972 | Herriman et al. |
| 3,658,673 | A | 4/1972 | Kugler et al. |
| 3,869,616 | A | 3/1975 | Smars et al. |
| 3,919,397 | A | 11/1975 | Gould |
| 3,938,988 | A | 2/1976 | Othmer |
| 3,954,954 | A | 5/1976 | Davis et al. |

(Continued)

FOREIGN PATENT DOCUMENTS

JP      56 102577      8/1981

(Continued)

OTHER PUBLICATIONS

European Search Report.

*Primary Examiner*—Brian Sines
(74) *Attorney, Agent, or Firm*—Martine Penilla & Gencarella, LLP

(57) ABSTRACT

A host and ancillary tool interface methodology for distributed processing is described. The host tool manages a process, except for the generation of a product used in the process. To generate the product, the host tool provides an indication to an ancillary tool that the product is to be generated, and the ancillary tool generates the product after detection of the indication with no further intervention by the host tool. To provide the indication, the host tool preferably activates a control line whose voltage is monitored by the ancillary tool, or alternatively, sets one or more bits in a memory which is periodically checked by the ancillary tool.

18 Claims, 4 Drawing Sheets

U.S. PATENT DOCUMENTS

| | | | |
|---|---|---|---|
| 4,145,403 A | 3/1979 | Fey et al. | |
| 4,266,113 A | 5/1981 | Denton et al. | |
| 4,351,810 A | 9/1982 | Martinez et al. | |
| 4,390,405 A | 6/1983 | Hahn et al. | |
| 4,410,940 A | 10/1983 | Carlson et al. | 364/200 |
| 4,482,525 A | 11/1984 | Chen | |
| 4,512,868 A | 4/1985 | Fujimura et al. | |
| 4,739,147 A | 4/1988 | Meyer et al. | |
| 4,766,287 A | 8/1988 | Morrisroe et al. | |
| 4,771,015 A | 9/1988 | Kanai et al. | |
| 4,794,230 A | 12/1988 | Seliskar et al. | |
| 4,812,201 A | 3/1989 | Sakai et al. | |
| 4,812,326 A | 3/1989 | Tsukazaki et al. | |
| 4,849,192 A | 7/1989 | Lyon | |
| 4,883,570 A | 11/1989 | Efthimion et al. | |
| 4,898,748 A | 2/1990 | Kruger, Jr. | |
| 4,926,001 A | 5/1990 | Alagy et al. | |
| 4,973,773 A | 11/1990 | Malone | |
| 5,012,065 A | 4/1991 | Rayson et al. | |
| 5,026,464 A | 6/1991 | Mizuno et al. | |
| 5,051,557 A | 9/1991 | Satzger | |
| 5,109,329 A | 4/1992 | Strelioff | 395/725 |
| 5,200,595 A | 4/1993 | Boulos et al. | |
| 5,338,399 A | 8/1994 | Yanagida | |
| 5,403,434 A | 4/1995 | Moslehi | |
| 5,403,630 A | 4/1995 | Matsui et al. | |
| 5,427,669 A | 6/1995 | Drummond | |
| 5,451,259 A * | 9/1995 | Krogh | 118/723 MR |
| 5,531,973 A | 7/1996 | Sarv | |
| 5,535,906 A | 7/1996 | Drummond | |
| 5,560,844 A | 10/1996 | Boulos et al. | |
| 5,599,425 A | 2/1997 | Lagendijk et al. | |
| 5,607,602 A | 3/1997 | Su et al. | |
| 5,620,559 A | 4/1997 | Kikuchi | |
| 5,652,021 A | 7/1997 | Hunt et al. | |
| 5,665,640 A | 9/1997 | Foster et al. | |
| 5,684,581 A | 11/1997 | French et al. | |
| 5,747,935 A | 5/1998 | Porter et al. | |
| 5,756,402 A | 5/1998 | Jimbo et al. | |
| 5,770,099 A | 6/1998 | Rice et al. | |
| 5,827,370 A | 10/1998 | Gu | |
| 5,853,602 A | 12/1998 | Shoji | |
| 5,877,471 A | 3/1999 | Huhn et al. | |
| 5,908,566 A | 6/1999 | Seltzer | |
| 5,917,286 A | 6/1999 | Scholl et al. | |
| 5,935,334 A | 8/1999 | Fong et al. | |
| 5,939,886 A | 8/1999 | Turner et al. | |
| 6,007,879 A | 12/1999 | Scholl | |
| 6,046,546 A | 4/2000 | Porter et al. | |
| 6,047,380 A | 4/2000 | Nolan et al. | 713/324 |
| 6,053,123 A | 4/2000 | Xia | |
| 6,066,568 A | 5/2000 | Kawai et al. | |
| 6,156,667 A | 12/2000 | Jewett | |
| 6,163,006 A | 12/2000 | Doughty et al. | |
| 6,183,605 B1 | 2/2001 | Schatz et al. | |
| 6,194,036 B1 | 2/2001 | Babayan et al. | |
| 6,197,119 B1 | 3/2001 | Dozoretz et al. | |
| 6,217,717 B1 | 4/2001 | Drummond et al. | |
| 6,222,321 B1 | 4/2001 | Scholl et al. | |
| 6,225,592 B1 | 5/2001 | Doughty | |
| 6,238,514 B1 | 5/2001 | Gu | |
| 6,251,792 B1 | 6/2001 | Collins et al. | |
| 6,291,938 B1 | 9/2001 | Jewett et al. | |
| 6,330,658 B1 | 12/2001 | Evoy et al. | 712/31 |
| 6,335,293 B1 * | 1/2002 | Luo et al. | 345/173 |
| 6,368,477 B1 | 4/2002 | Scholl | |
| 6,384,540 B1 | 5/2002 | Porter, Jr. et al. | |
| 6,410,880 B1 | 6/2002 | Putvinski et al. | |
| 6,432,260 B1 | 8/2002 | Mahoney et al. | |
| 6,488,745 B2 | 12/2002 | Gu | |
| 6,494,957 B1 | 12/2002 | Suzuki | |
| 6,521,099 B1 | 2/2003 | Drummond et al. | |
| 6,521,792 B2 | 2/2003 | Akteries et al. | |
| 6,544,896 B1 | 4/2003 | Xu et al. | |
| 6,556,949 B1 * | 4/2003 | Lyon | 702/182 |
| 6,579,805 B1 * | 6/2003 | Bar-Gadda | 438/710 |
| 6,587,744 B1 * | 7/2003 | Stoddard et al. | 700/121 |
| 6,588,007 B1 * | 7/2003 | Pasadyn et al. | 716/19 |
| 6,615,098 B1 * | 9/2003 | Bode et al. | 700/121 |
| 6,624,082 B2 * | 9/2003 | Luo et al. | 438/724 |
| 6,633,017 B1 | 10/2003 | Drummond et al. | |
| 6,800,559 B2 * | 10/2004 | Bar-Gadda | 438/710 |
| 6,801,817 B1 * | 10/2004 | Bode et al. | 700/97 |
| 6,831,555 B1 * | 12/2004 | Miller et al. | 340/506 |
| 6,892,108 B2 * | 5/2005 | Mautz et al. | 700/108 |
| 6,952,656 B1 * | 10/2005 | Cordova et al. | 702/117 |
| 6,955,928 B1 * | 10/2005 | Brennan | 438/14 |
| 2002/0134244 A1 | 9/2002 | Gu | |
| 2003/0045098 A1 * | 3/2003 | Verhaverbeke et al. | 438/689 |
| 2003/0045131 A1 * | 3/2003 | Verbeke et al. | 438/795 |
| 2003/0077402 A1 | 4/2003 | Amann et al. | |

FOREIGN PATENT DOCUMENTS

| | | |
|---|---|---|
| JP | 5 275392 | 10/1993 |
| JP | 6 295907 | 10/1994 |
| JP | 7 106593 | 4/1995 |
| JP | 10 098038 | 4/1998 |
| WO | WO 91/17285 | 11/1991 |

* cited by examiner

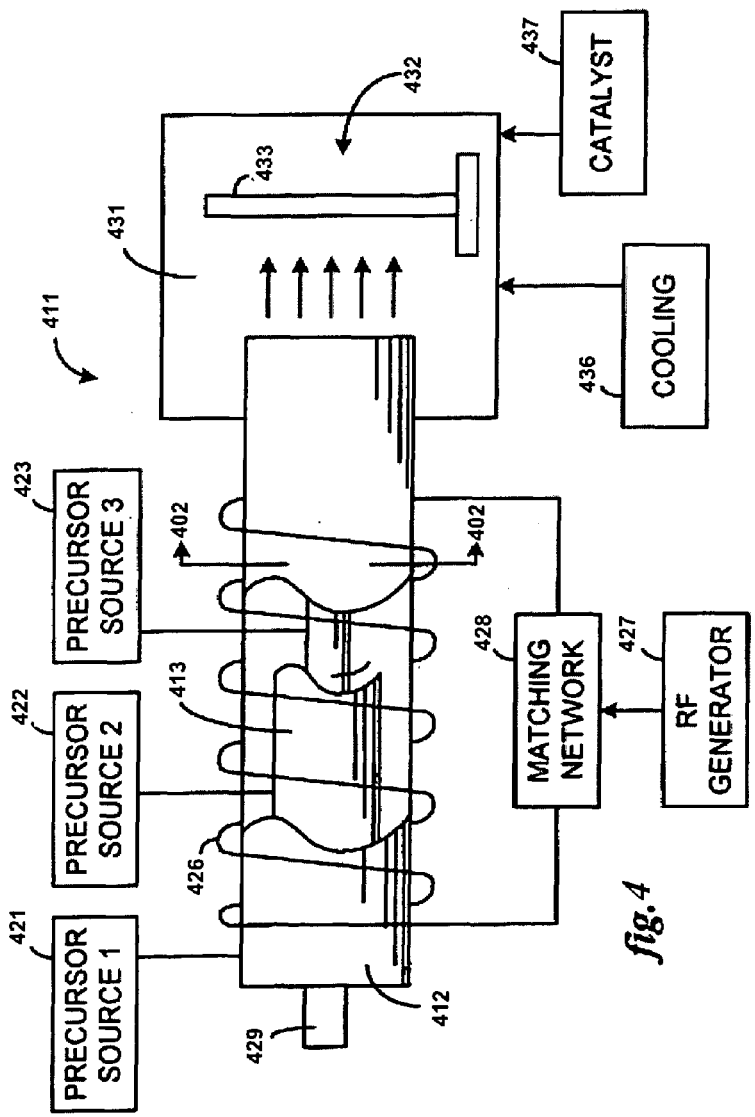
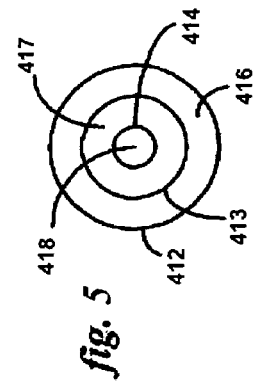
fig. 4
fig. 5

HOST AND ANCILLARY TOOL INTERFACE METHODOLOGY FOR DISTRIBUTED PROCESSING

FIELD OF THE INVENTION

The present invention generally relates to computer interface techniques and in particular, to a host and ancillary tool interface methodology for distributed processing.

BACKGROUND OF THE INVENTION

In the prior art system of FIG. 1, a host tool 10 includes a processor 11 managing a semiconductor process performed in a process chamber 30 on a semiconductor wafer 31 according to a process recipe stored in memory 12. Although shown as separate items in the figure, the process chamber 30 is commonly integrated with or in the host tool 10. Material sources 53 and 54 provide materials directly to the process chamber 30. For these materials, the processor 11 causes main flow control valves 73 and 74 respectively in flow lines 63 and 64 to open by activating control lines 83 and 84 with appropriate signals through input/output (I/O) ports 16 and 17 at the appropriate times according to the process recipe. Precursor material sources 51 and 52, on the other hand, provide precursor materials to a radio frequency (RF) inductively coupled plasma (ICP) torch 21 of an ancillary tool 20. For these precursor materials, the processor 11 causes main flow control valves 71 and 72 in flow lines 61 and 62 to be opened by activating control lines 81 and 82 with appropriate signals through input/output (I/O) ports 14 and 15 at the appropriate times according to the process recipe, while providing controls through bus 40 to the ancillary tool 20 so that the RF ICP torch 21 generates a product such as a chemical species from the precursor materials and provides the product to the process chamber 30 through flow line 90 for processing the semiconductor wafer 31.

In addition to managing the processing of the semiconductor wafer 31, the host tool 10 may have other important tasks to perform. Therefore, it is useful to distribute the semiconductor processing so that the ancillary tool 20 generates the product and provides it to the process chamber 30 with minimal to no supervision from the host tool 10, while at the same time, performing such function at the appropriate time according to the process recipe. When the ancillary tool 20 is manufactured and distributed by a different vendor than the host tool 10, however, the two tools may be designed for different operating systems and/or communication protocols, thus complicating the task of interfacing the two tools with each other.

OBJECTS AND SUMMARY OF THE INVENTION

Accordingly, it is an object of the present invention to provide a host and ancillary tool interface methodology for distributed processing.

Another object is to provide a host and ancillary tool interface methodology that requires minimal host tool supervision of the ancillary tool's generation of a product.

Another object is to provide a host and ancillary tool interface methodology that provides ancillary tool generation of a product in a transparent manner to the host tool.

Still another object is to provide a host and ancillary tool interface methodology that does not require host and ancillary tools to have the same operating system or communication protocol.

These and additional objects are accomplished by the various aspects of the present invention, wherein briefly stated, one aspect is a method for interfacing host and ancillary tools, comprising: activating a control line of a host tool when a product is to be provided; and generating and providing the product when activation of the control line is detected by an ancillary tool.

Another aspect is an apparatus for generating and providing a product as part of a process, comprising: a host tool configured to manage a process and activate a control line when a product is to be provided as part of the process; and an ancillary tool configured to generate and provide the product when activation of the control line is detected.

Another aspect is an apparatus for generating and providing a product as part of a process, comprising an ancillary tool configured to generate a product when the ancillary tool detects activation of a control line activated by a host tool configured to activate the control line when the product is to be provided as part of a process managed by the host tool.

Another aspect is a system for semiconductor processing, comprising: a process chamber for housing at least one semiconductor wafer for semiconductor processing; a host tool configured to manage the semiconductor processing and activate a control line when a product is to be provided to the process chamber as part of the semiconductor processing; and an ancillary tool configured to generate and provide the product to the process chamber when activation of the control line is detected.

Still another aspect is an apparatus for generating a chemical species, comprising: a product generator unit; and a detection unit configured to detect an indication provided by a host tool to generate a product as part of a process being managed by the host tool, and to activate the product generator unit to generate the product upon detecting the indication.

Yet another aspect is a method for interfacing host and ancillary tools for distributed processing of a semiconductor wafer, comprising: providing an indication to an ancillary tool when a product is to be generated and provided to a process chamber for processing a semiconductor wafer as a part of a process recipe being executed by a host tool; and automatically causing a product generator in the ancillary tool to generate and provide the product to the process chamber without further intervention from the host tool upon detecting the indication.

Additional objects, features and advantages of the various aspects of the present invention will become apparent from the following description of its preferred embodiment, which description should be taken in conjunction with the accompanying drawings.

BRIEF DESCRIPTION OF THE DRAWINGS

FIG. 4 is a diagrammatic view of a chemical generator incorporating aspects of the invention.

FIG. 5 is a cross-sectional view taken along line 402-402 of FIG. 4.

DETAILED DESCRIPTION OF THE PREFERRED EMBODIMENT

Figure 1:
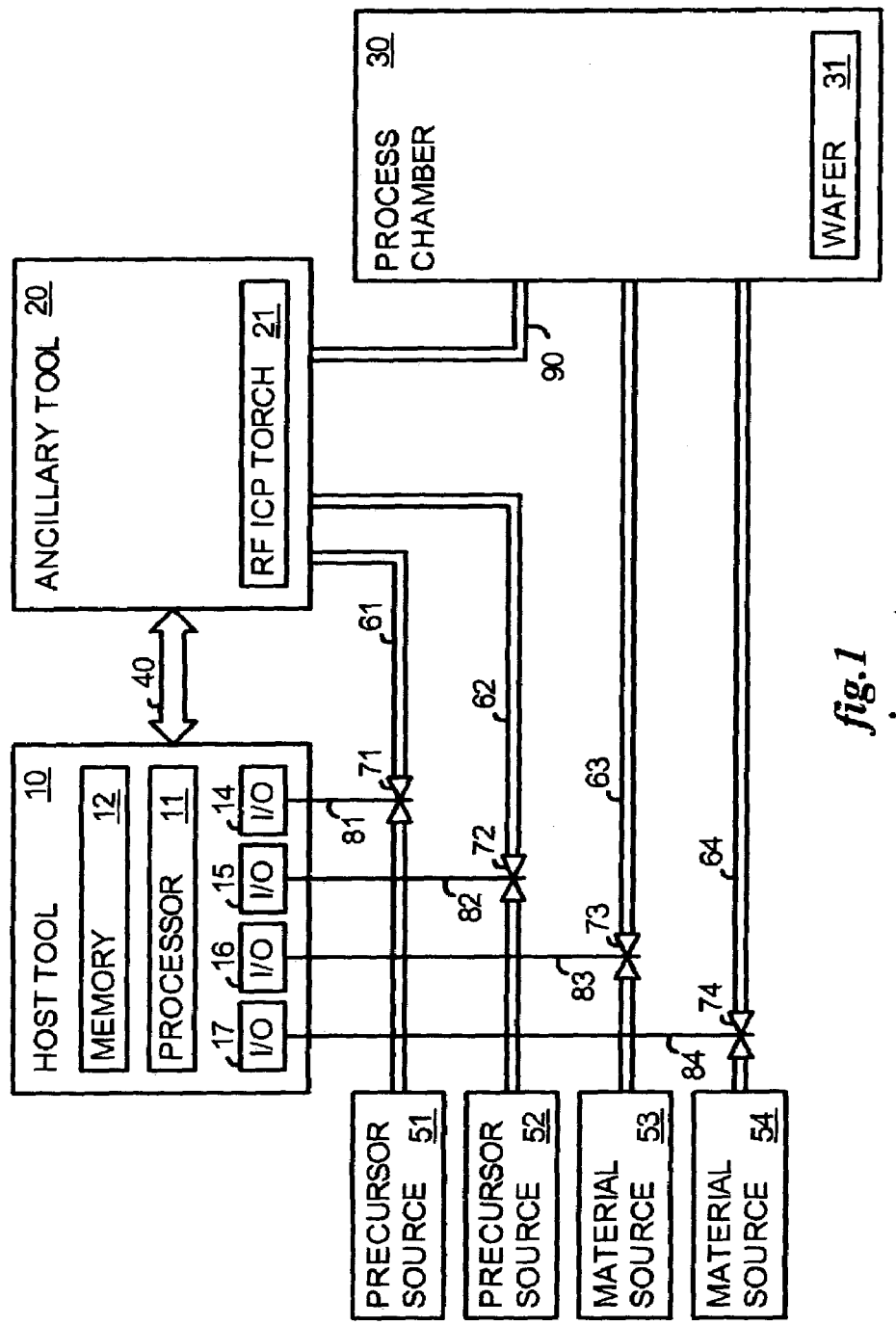
FIG. 1 illustrates a block diagram of a prior art semiconductor processing system.
Figure 2:
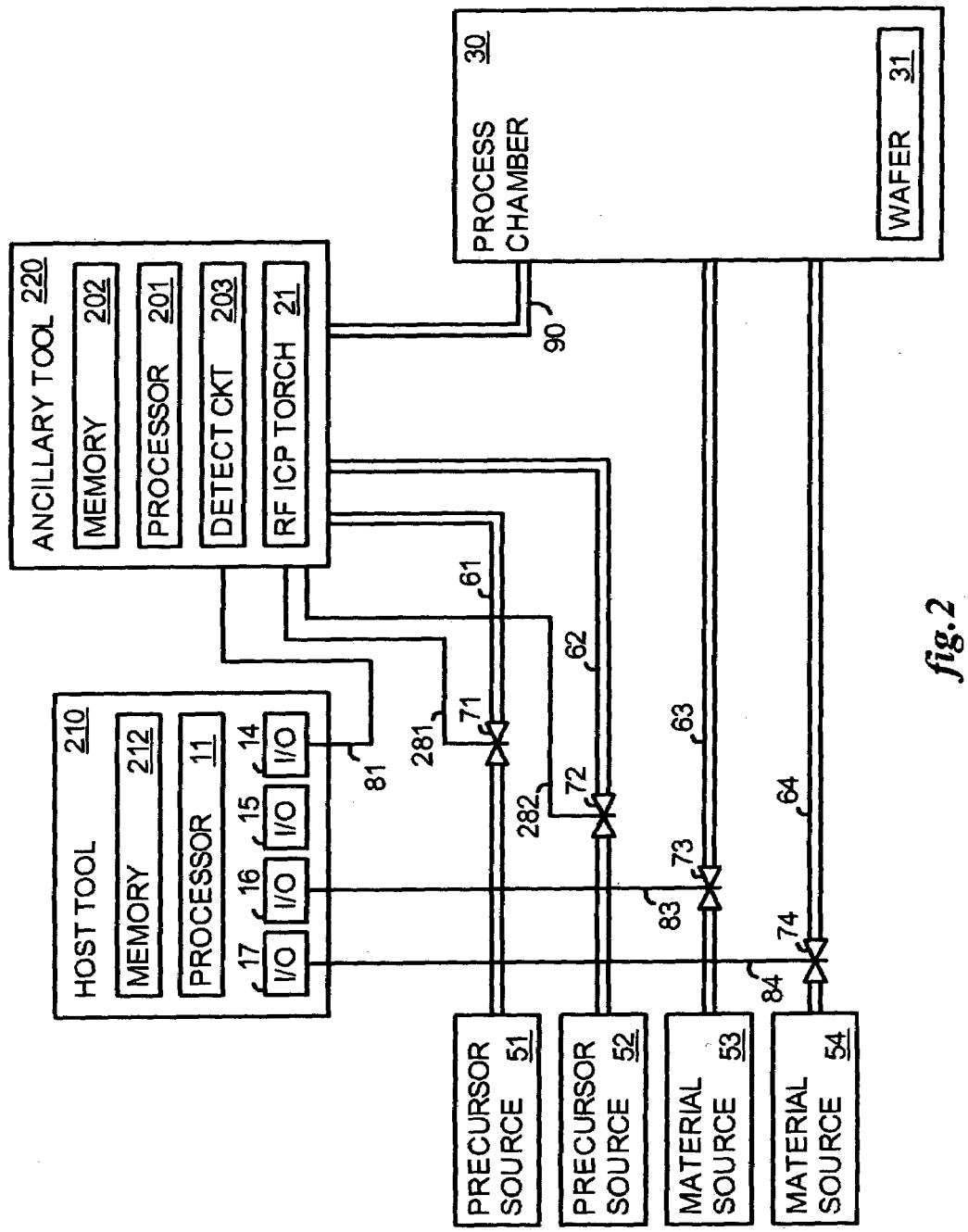
FIG. 2 illustrates a block diagram of a first embodiment of a semiconductor processing system utilizing aspects of the present invention.
Figure 3:
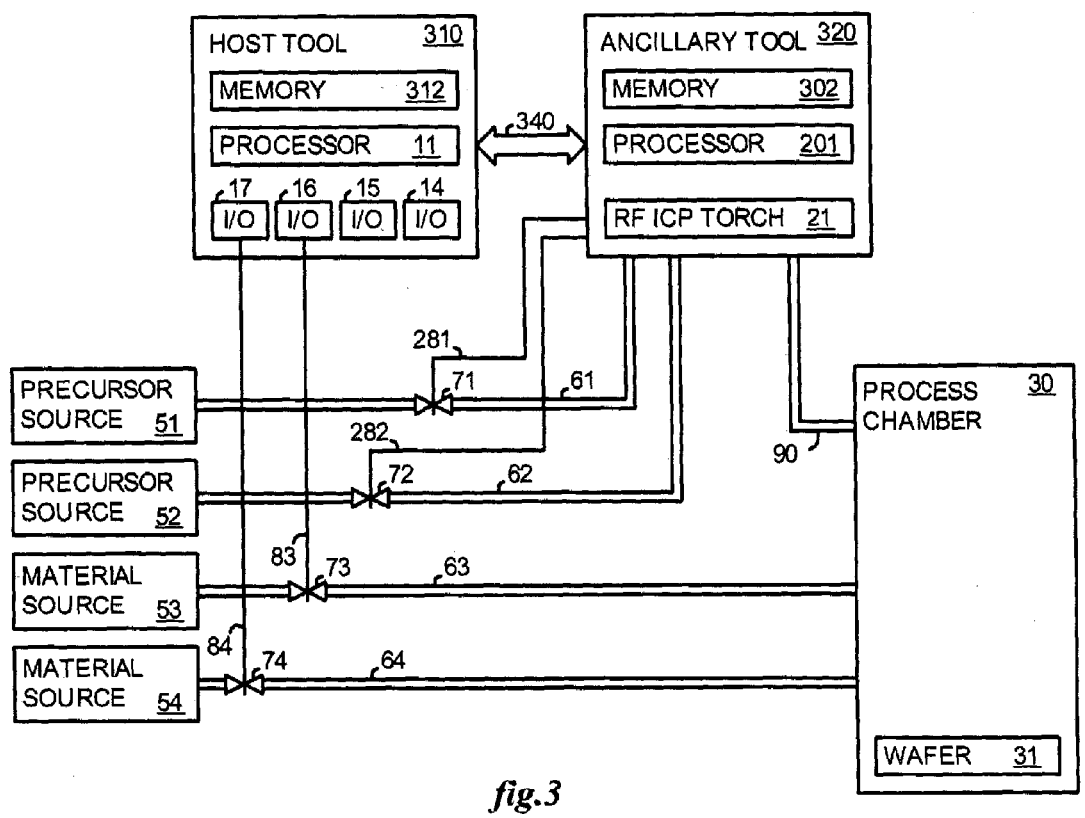
FIG. 3 illustrates a block diagram of a second embodiment of a semiconductor processing system utilizing aspects of the present invention.

In FIGS. 1~3, items in the figures that are identified by the same reference number are functionally equivalent and similarly constructed.

FIG. 2 illustrates, as an example, a block diagram of a first and preferred embodiment of a semiconductor processing system. The application in this case is similar to that described in reference to FIG. 1, in that a host tool 210 includes a processor 11 managing a semiconductor process performed in a process chamber 30 on a semiconductor wafer 31 according to a process recipe stored in memory 212. Although shown as separate items in the figures to simplify illustration of material flows, the process chamber 30 is preferably integrated with or in the host tool 210.

The process recipe in this case, however, is a modified version of that described in reference to FIG. 1, because the processor 11 of the host tool 210 in this case does not control the generation of a product which is to be generated by an ancillary tool 220 and provided to the process chamber 30 as part of the process. Therefore, that portion of the process recipe has been deleted in the modified version of the process recipe, and the deleted portion (i.e., the "product recipe") has instead been stored in a memory 202 of the ancillary tool 220 for execution by its processor 201. Thus, although the timing of when the product is generated and provided to the process chamber 30 is still controlled by the processor 11 of the host tool 210 in accordance with the process recipe stored in its memory 212, the actual generation and providing of the product to the process chamber 30 by the ancillary tool 220 is done transparently to the host tool 210.

When it is time to provide the product to the process chamber 30 as part of the process according to the process recipe stored in memory 212, the host tool 210 provides an indication to the ancillary tool 230 that the product is to be generated. The processor 11 provides the indication in this case by activating control line 81 with an appropriate signal passed through input/output (I/O) port 14. Thus, it appears from the process recipe that the product is being provided just like any other material from a material source, such as material sources 53 and 54, directly to the process chamber 30 for processing the semiconductor wafer 31.

A detection circuit 203 in the ancillary tool 220 monitors the control line 81 and detects the indication that the product is to be generated by, for example, detecting a voltage magnitude such as 24.0 volts on the control line 81. Upon such detection, the detection circuit 203 then notifies the processor 201 so that it causes the RF ICP torch 21 to generate the product according to the product recipe stored in memory 202 and consequently, provide the product to the process chamber 30 through flow line 90.

In order to generate the product according to the product recipe, the processor 201 causes main flow control valves 71 and 72 in flow lines 61 and 62 to be opened by activating control lines 281 and 282 with appropriate signals at the appropriate times according to the product recipe so that precursor materials respectively from precursor material sources 51 and 52 are provided directly to the RF ICP torch 21.

The product in this case is a chemical species formed from the precursor materials provided by precursor material sources 51 and 52. Additional details in the generation of such chemical species using an RF ICP torch such the RF ICP torch 21 are included in commonly owned, U.S. patent application Ser. No. 10/404,216 entitled "Remote ICP Torch for Semiconductor Processing," filed Mar. 31, 2003, which is incorporated herein by this reference.

Also to support the process recipe, material sources 53 and 54 provide materials directly to the process chamber 30 as the processor 11 causes main flow control valves 73 and 74 respectively in flow lines 63 and 64 to open by activating control lines 83 and 84 with appropriate signals through input/output (I/O) ports 16 and 17 at the appropriate times according to the process recipe.

Although this example depicts two precursor material sources, 51 and 52, and two material sources, 53 and 54, being used, it is to be appreciated that the number of such sources as well as the types of materials that they provide depends upon and varies with the process and product recipes being followed for the semiconductor processing.

FIG. 3 illustrates a block diagram of a second and embodiment of a semiconductor processing system. The application in this case is also similar to that described in reference to FIG. 1 in that a host tool 310 includes a processor 11 managing a semiconductor process performed in a process chamber 30 on a semiconductor wafer 31 according to a process recipe stored in memory 312. Although shown as separate items in the figures to simplify illustration of material flows, the process chamber 30 is preferably integrated with or in the host tool 310.

The process recipe in this case, is also a modified version of that described in reference to FIG. 1, because the processor 11 in this case also does not control the generation of a product by an ancillary tool 320. In this example, however, the host tool 310 provides a different type of indication to the ancillary tool 320 to generate the product.

The indication to generate the product in this case involves either the setting of one or more bits in a memory 302 of the ancillary tool 320 in a similar fashion as conventionally done to set bits in an interrupt flag field, or alternatively, the activation of an interrupt line coupled to the ancillary tool 320. The ancillary tool 320 then detects the indication as it would a conventional interrupt provided in an interrupt flag field or on an interrupt line, and then generates and provides the product to the process chamber 30 upon detection of the indication.

The product and its generation in this example is the same as described in reference to FIG. 2. Also, the use of precursor materials respectively from the precursor material sources 51 and 52 for the product recipe, and the use of materials respectively from the material sources 53 and 54 for the process recipe are the same as described in reference to FIG. 2.

FIG. 4 is a diagrammatic view of a chemical generator incorporating aspects of the invention. FIG. 5 is a cross-sectional view taken along line 402-402 of FIG. 4. As illustrated in FIG. 4, a chemical generator includes a free radical source 411 which has one or more chambers in which free radicals are created and delivered for recombination into stable species. In the embodiment illustrated, the source has three chambers which are formed by elongated, concentric tubes 412-414. Those chambers include a first annular chamber 416 between the outermost tube 412 and the middle tube 413, a second annular chamber 417 between middle tube 413 and the innermost tube 414, and a third chamber 418 inside the innermost tube 414. The tubes are fabricated of a material such as ceramic or quartz.

The number of tubes which are required in the generator is dependent upon the chemical species being generated and the reaction by which it is formed, with a separate chamber usually, but not necessarily, being provided for each type of free radical to be used in the process.

Gases or other precursor compounds from which the free radicals are formed are introduced into the chambers from sources 421-423 or by other suitable means. Such precursors can be in gaseous, liquid and/or solid form, or a combination thereof.

As previously explained, although a separate chamber may be used for providing each type of free radicals, it is also contemplated for certain chemical reactions such as described below that a single chamber may also be used for providing more than one type of free radicals. In such a case, gases or other precursor compounds from which the more than one type of free radicals are formed are introduced into the single chamber from corresponding sources.

A plasma is formed within the one or more chambers to create the free radicals, and in the embodiment illustrated, the means for generating the plasma includes an induction coil 426 disposed concentrically about the one or more tubes, a radio frequency (RF) power generator 427 connected to the coil by a matching network 428, and a Tesla coil 429 for striking an arc to ignite the plasma. The plasma can, however, be formed by any other suitable means such as RF electrodes or microwaves.

In the embodiment illustrated, the free radicals are recombined to form the desired species downstream of the tubes. In this case, recombination takes place in a chamber 431 which is part of a reactor 432 in which a semiconductor wafer 433 is being processed. Recombination can be promoted by any suitable means such as by cooling 436 and/or by the use of a catalyst 437.

Cooling can be effected in a number of ways, including the circulation of a coolant such as an inert gas, liquid nitrogen, liquid helium or cooled water through tubes or other suitable means in heat exchange relationship with the reacting gases.

A catalyst can be placed either in the cooling zone or downstream of it. It can, for example, be in the form of a thin film deposited on the wall of a chamber or tube through which the reacting gases pass, a gauze placed in the stream of gas, or a packed bed. The important thing is that the catalyst is situated in such a way that all of the gas is able to contact its surface and react with it.

If desired, monitoring equipment such as an optical emission spectrometer can be provided for monitoring parameters such as species profile and steam generation.

Although the various aspects of the present invention have been described with respect to a preferred embodiment, it will be understood that the invention is entitled to full protection within the full scope of the appended claims.

We claim:

1. A method for interfacing host and ancillary tools, comprising:
    activating a control line of a host tool when a product is to be provided, wherein said product is at least one of a plurality of predetermined chemical specie; and
    generating and providing said at least one of the plurality of predetermined chemical specie to a process chamber when activation of said control line is detected by an ancillary tool wherein generating the at least one of the plurality of predetermined chemical specie includes:
        introducing a plurality of precursor materials into corresponding plasma chambers in a chemical generator in a RF ICP torch;
        forming ionized gas plasmas in the plasma chambers to create free radicals from the precursor materials; and
    wherein providing at least one of the plurality of predetermined specie to the process chamber includes:
        providing the created free radicals to the process chamber through a flow line; and
        combining the free radicals to form the at least one of the plurality of predetermined chemical specie in close proximity to a semiconductor wafer in the process chamber, the precursor materials being selected to produce the free radicals needed to form the at least one of the plurality of predetermined chemical specie.

2. The method according to claim 1, wherein said activating said control line comprises providing host tool program code to said host tool to activate said control line when said product is to be provided.

3. The method according to claim 2, wherein said host tool program code is part of a host tool program implementing a host tool recipe for semiconductor processing.

4. The method according to claim 1, wherein said process chamber is used for semiconductor processing.

5. The method according to claim 1, wherein said generating said product comprises providing ancillary tool program code to said ancillary tool to generate said product when said control line is detected by said ancillary tool.

6. The method according to claim 5, wherein said ancillary tool program code is part of an ancillary tool program implementing an ancillary tool recipe for semiconductor processing.

7. The method according to claim 1, wherein said generating said product comprises generating said chemical species from one or more precursor materials.

8. The method according to claim 1, wherein said generating said product comprises generating said chemical species from one or more precursor materials subjected to an induced field to generate free radicals as part of said generating said chemical species.

9. The method according to claim 1, wherein said control line is coupled to an input/output port of said host tool, and said ancillary tool detects activation of said control line by a voltage magnitude detected on said control line.

10. An apparatus for generating and providing a product as part of a process, comprising:
    a host tool configured to manage a process and activate a control line when a product is to be provided as part of said process wherein the control line is coupled to the host tool and wherein said product is at least one of a plurality of predetermined chemical specie, wherein the host tool includes a process chamber wherein the process chamber encloses at least one semiconductor wafer for semiconductor processing;
    an ancillary tool configured to generate and provide said at least one of the plurality of predetermined chemical specie to the process chamber, when activation of said control line is detected, wherein the control line is coupled to the ancillary tool and wherein the ancillary tool includes a chemical generator in a RF ICP torch, the chemical generator including a plurality of concentric plasma chambers and wherein each one of the plurality of concentric plasma chambers are coupled to at least one of a plurality of precursor material sources and wherein generating the at least one of the plurality of predetermined chemical specie includes:
        introducing a plurality of precursor materials into corresponding concentric plasma chambers in the chemical generator;

forming ionized gas plasmas in the concentric plasma chambers to create free radicals from the precursor materials; and wherein each one of the plurality of concentric plasma chambers includes a corresponding outlet and the corresponding outlet is coupled to the process chamber through a flow line and wherein providing at least one of the plurality of predetermined specie to the process chamber includes:

providing the created free radicals to the process chamber; and combining the free radicals to form the at least one of the plurality of predetermined chemical specie in close proximity to a semiconductor wafer in the process chamber, the precursor materials being selected to produce the free radicals needed to form the at least one of the plurality of predetermined chemical specie.

11. The apparatus according to claim 10, wherein said host tool includes a host tool program for managing said process and causing said host tool to activate said control line when said product is to be provided as part of said process.

12. The apparatus according to claim 10, wherein said ancillary tool is adapted to provide said chemical species to a process chamber used for semiconductor processing.

13. The apparatus according to claim 10, wherein said ancillary tool includes an ancillary tool program that starts to execute when activation of said control line is detected.

14. The apparatus according to claim 13, wherein said ancillary tool program causes said ancillary tool to implement an ancillary tool recipe for generating said product.

15. The apparatus according to claim 10, wherein said ancillary tool program causes said ancillary tool to generate said chemical species from one or more precursor materials subjected to an induced field to generate free radicals as part of said generation.

16. The apparatus according to claim 10, wherein said control line is coupled to an input/output port of said host tool, and said ancillary tool detects activation of said control line by a voltage magnitude detected on said control line.

17. The apparatus according to claim 10, further comprising a memory, and said activating the control line is provided by said host tool setting one or more bit locations in said memory.

18. The apparatus according to claim 10, wherein said activating the control line is provided by said host tool generating an interrupt signal, and a detection unit detects said indication by detecting said interrupt signal.

* * * * *